United States Patent [19]

Smith

[11] 4,133,296

[45] Jan. 9, 1979

[54] TOY FOR ANIMALS

[76] Inventor: Helen A. Smith, 536 Bradford, Pasadena, Calif. 91105

[21] Appl. No.: 815,292

[22] Filed: Jul. 13, 1977

[51] Int. Cl.$^2$ ............................................. A01K 15/00
[52] U.S. Cl. ...................................... 119/29; 119/29.5
[58] Field of Search ................. 119/29, 29.5; 225/5 D; 46/1 R

[56] References Cited

U.S. PATENT DOCUMENTS

| 2,194,736 | 3/1940 | DeBruler | 119/29.5 |
| 2,718,873 | 9/1955 | Buckner | 119/29.5 |
| 3,459,158 | 8/1969 | Mitchell, Jr. | 119/29 |

Primary Examiner—Hugh R. Chamblee
Attorney, Agent, or Firm—Huebner & Worrel

[57] ABSTRACT

A play toy for an animal, the toy being formed of an elongated tubular member of flexible material, the member having closed sides and ends, and at least one weight part in the member to develop forces therein, from where it is held by an animal, toward said weight part when moved by the animal so that the weight part tends to move around or away from the holding position. For dogs, for example, the weight parts are tennis balls, or for a smaller dog, smaller balls, and for cats, the weight parts may be sacks of catnip secured in the tubular member.

11 Claims, 7 Drawing Figures

TOY FOR ANIMALS

BACKGROUND OF THE INVENTION

In the prior art there have been many toys for animals which have been chewable or throwable. However, the chewing of the toy, for example, rubber, results in the animal eating the material which is undesirable, or it is chewed up in a manner in a house so that it presents a constant cleaning up problem. In other toys which may be more lasting, they become very dirty, and it is frequently difficult to wash them or get them clean, if washed.

SUMMARY OF THE INVENTION

The present invention is a canvas toy made in tubular form and which may be tossed while being held in a dog's mouth, for example, or it may be thrown for retrieval by the dog. The canvas, being durable, can be chewed indefinitely and with great resistane to disintegration.

Accordingly, it is an object of the invention to provide an improved toy for animals.

It is another object of the invention to provide a toy for animals made of flexible and durable canvas, and easily washed and cleaned so that it can be restored to its original state of cleanliness without wearing it out.

It is still another object of the invention to provide a toy, as described in the preceding paragraphs, which is weighted at its ends, or intermediate its ends, with balls, or in the case of toys for cats, with sacks of catnip.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENT

Figure 1:
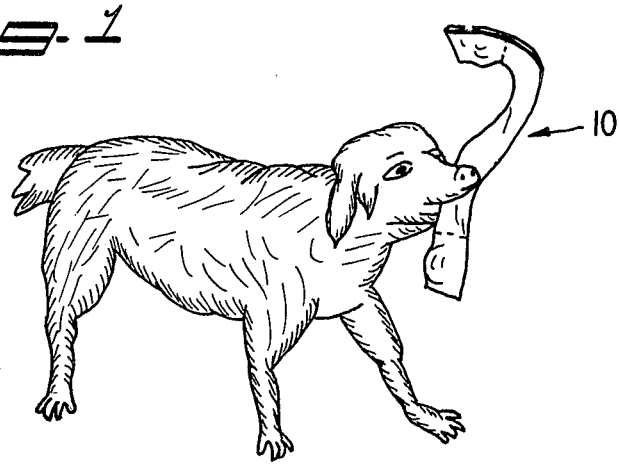
FIG. 1 is a view of a dog playing with the toy according to the invention.
Figure 2:
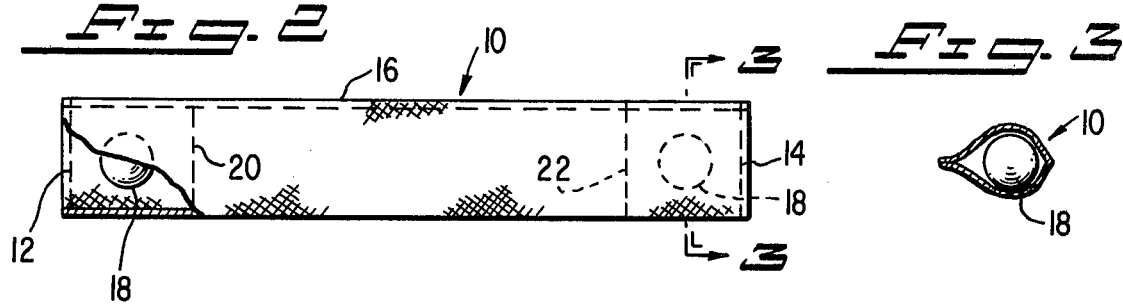
FIG. 2 is a plan view of the toy shown in FIG. 1.
Figure 3:
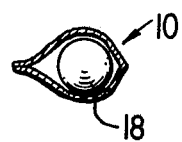
FIG. 3 is a view of the toy, taken along the lines 3—3 in FIG. 2.

Referring again to the drawings, in FIGS. 1-3 a toy, generally designated as 10, is formed of a sheet of canvas which is folded to form an enclosed tube having the stitches 12 and 14 at its ends and 16 on the elongated side. Tennis balls 18 are secured in the two outer ends by stitching 20 and 22 forming pockets enclosing the balls. The tube is relatively flat between the balls.

The dog may, as shown in FIG. 1, play with the toy by itself by causing movement thereof, and in the movement the weight of the balls develops forces which tend to move the toy around and away from the holding position as though the toy is being pulled away from the dog. Dogs typically like to hold a toy and have a person pull the toy away with the dog resisting and trying to hold on, but with the present invention the weight of the balls provide the same effect when the dog is playing by itself. In addition, when the dog causes one of the balls to hit the floor, or another surface, the ball will bounce to add to the playing effect. This kind of playing is not harmful to the dog's teeth. Harm can occur if the dog holds a toy and someone tries to pull it from its mouth.

Figure 4:
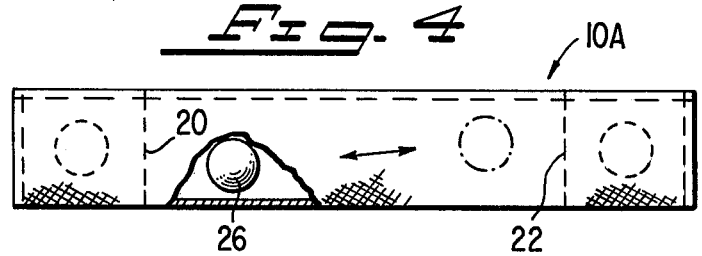
FIG. 4 is a plan view of the toy illustrating another embodiment of the invention.

FIG. 4 illustrates a toy, generally designated as 10A, which is the same as the toy shown in FIG. 2, except a ball 26 is positioned loosely intermediate the stitches at 20 and 22. The ball 26 is movable between the stitches and is adapted to move away from the position where the toy is being held in the dog's mouth, so as to cause greater force and movement away from the holding position. This will add to the tugging effect that dogs enjoy.

Figure 7:
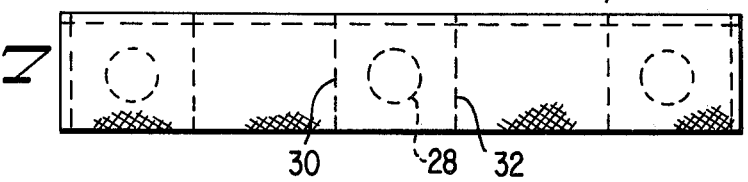
FIG. 7 is a plan view of still another embodiment of the invention.

In FIG. 7, a toy 10B is made the same as those above described, except a third ball 28 is shown in a pocket formed by stitches 30 and 32 in the approximate center of the tube. This again will cause additional force and movement away from the holding position, according to the action of the dog.

Tennis balls have been found to be particularly adaptable in the toys described, but for small dogs, small rubber balls can be used instead. Where tennis balls are used, the tubes are typically five inches by twenty-five inches, the pockets being five inches square. For small dogs, the tubes are three inches by twelve inches, having two inch by three inch pockets.

Figure 5:
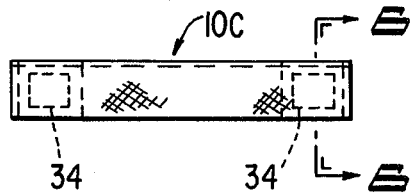
FIG. 5 is a plan view of another embodiment of the invention, which may be used by cats.
Figure 6:
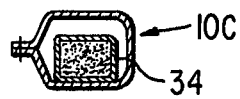
FIG. 6 is a cross-sectional view of the toy, taken along the lines 6—6 in FIG. 5.

In FIGS. 5 and 6, a tube 10C of the same type as those described above has pockets formed at its end by stitching, and in this embodiment, instead of balls, bags 34 of catnip are inserted. This toy is particularly adapted for use for play by cats because of the porosity of the canvas tube and the bags 34. They are able to chew on the catnip as well as to toss the toy around as a cat typically tosses a single bag of catnip. This toy can also be cleaned off successfully if care is taken not to wash out the catnip. The cat toys are typically one and one-half inches by eight inches, the catnip pockets being about one and one-half inches square.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims, wherein various portions have been separated for clarity of reading and not for emphasis.

I claim:

1. A play toy for an animal, comprising:
    an elongated tubular member of flexible material, said member having closed sides and ends,
    at least one weight part fixed in the member adjacent each of the ends thereof by stitching across said tubular member adjacent the ends to form pockets to contain the weight parts,
    said tubular member being generally flat between said pockets, said weight parts being adapted to develop forces in the tubular member from where it is held and moved by an animal, the forces being toward either weight part so that either or both weight parts tend to move around or away from the holding position.

2. The invention according to claim 1 in which: said tubular member is comprised of a sheet of canvas having its edges sewn together.

3. A play toy for an animal, comprising:
an elongated tubular member of flexible material, said member having closed sides and ends,
at least one weight part secured in the member adjacent one end thereof by forming a pocket in said one end to contain a weight part,
said member having a flattenable portion extending from said pocket,
said weight part being adapted to develop forces in said member from where the member is held away from the weight part by an animal, the forces being toward said weight part when moved by the animal so that the weight part tends to move around or away from the holding position.

4. The invention according to claim 3 in which: the weight part is a ball.

5. The invention according to claim 3 in which:
a second weight part is secured in a pocket adjacent the other end of said member.

6. The invention according to claim 5 in which:
a weight part is fitted intermediate the ends of said member.

7. The invention according to claim 5 in which: each weight part is a tennis ball.

8. The invention according to claim 5 in which:
each weight part is formed of catnip fitted in said pocket formed adjacent said ends.

9. The invention according to claim 5 in which:
a weight part is intermediate the ends of said member and movable between said ends.

10. The invention according to claim 9 in which: each weight part is a tennis ball.

11. The invention according to claim 10 in which:
each of the balls is fixed adjacent the ends by stitching across said tubular member to form a pocket,
said tubular member being generally flat in areas spaced between said balls.

* * * * *